United States Patent
Caswell (10) Patent No.: US 6,170,968 B1
(45) Date of Patent: Jan. 9, 2001

(54) MOTION ACTIVATED ROTATABLE ILLUMINATOR

(75) Inventor: Ty J. Caswell, Big Lake, MN (US)

(73) Assignee: Outdoor Creations, Inc., Coon Rapids, MN (US)

(*) Notice: Under 35 U.S.C. 154(b), the term of this patent shall be extended for 0 days.

(21) Appl. No.: 09/302,933

(22) Filed: Apr. 30, 1999

Related U.S. Application Data (60) Provisional application No. 60/117,971, filed on Jan. 29, 1999, and provisional application No. 60/109,172, filed on Nov. 20, 1998.

(51) Int. Cl.[7] ................................................. B60Q 1/11
(52) U.S. Cl. .......................... 362/469; 362/464; 362/473; 362/276; 362/802
(58) Field of Search ............................... 362/35, 473, 157, 362/196, 200, 205, 276, 311, 800, 802, 464, 469

(56) References Cited

U.S. PATENT DOCUMENTS

| | | | |
|---|---|---|---|
| 2,611,995 | 9/1952 | Krapp | 46/69 |
| 2,739,419 * | 3/1956 | Cleveland | 446/242 |
| 2,841,922 | 7/1958 | Kolintzas | 46/228 |
| 5,245,517 | 9/1993 | Fenton | 362/156 |
| 5,278,732 * | 1/1994 | Frankum | 362/473 |
| 5,283,547 | 2/1994 | Leon | 340/432 |
| 5,333,101 * | 7/1994 | McEvoy | 362/473 |
| 5,392,200 | 2/1995 | Milde | 362/78 |
| 5,418,697 | 5/1995 | Chiou | 362/72 |
| 5,456,478 | 10/1995 | Hsu et al. | 280/11.22 |
| 5,465,197 | 11/1995 | Chien | 362/203 |
| 5,477,427 | 12/1995 | Forman | 362/72 |
| 5,536,074 | 7/1996 | Hsu et al. | 301/5.3 |
| 5,550,721 | 8/1996 | Rapisarda | 362/205 |
| 5,561,414 | 10/1996 | Chin | 340/432 |
| 5,566,384 | 10/1996 | Chien | 362/84 |
| 5,572,817 | 11/1996 | Chien | 40/554 |
| 5,584,562 | 12/1996 | Geran | 362/72 |
| 5,611,621 * | 3/1997 | Chien | 362/84 |
| 5,624,175 * | 4/1997 | Gelormino et al. | 362/473 |
| 5,653,523 | 8/1997 | Roberts | 362/78 |
| 5,683,164 | 11/1997 | Chien | 362/78 |
| 5,704,705 | 1/1998 | Chien | 362/84 |
| 5,720,651 | 2/1998 | Chien | 446/34 |
| 5,730,520 | 3/1998 | Hsu et al. | 362/78 |
| 5,763,872 | 6/1998 | Ness | 250/214 |
| 5,765,936 | 6/1998 | Walton et al. | 362/72 |
| 5,779,344 | 7/1998 | Tseng | 362/78 |
| 5,800,035 | 9/1998 | Aichele | 362/31 |
| 5,800,039 | 9/1998 | Lee | 362/72 |
| 5,803,574 * | 9/1998 | Szaniszlo | 362/551 |
| 5,839,814 | 11/1998 | Roberts | 362/78 |
| 5,844,377 | 12/1998 | Anderson et al. | 315/251 |

* cited by examiner

Primary Examiner—Sandra O'Shea
Assistant Examiner—Ismael Negron
(74) Attorney, Agent, or Firm—Kinney & Lange, P.A.

(57) ABSTRACT

An illuminator has all of it's electrical components mounted within a housing that is secured to the rotatable object. Those components include a light source, an electrical power source, a first switch activated by intermittent motion of the housing and a second switch activated by centrifugal forces caused by rotation of the rotatable object. The illuminator components also include a timer which has a timing cycle and which is operably connected relative to the first switch and the second switch such that activation of either the first switch or the second switch initiates that timing cycle of the timer and enables the flow of electricity from the power source to the light source during the timing cycle. The light source can include an electro luminescent strip or light emitting diodes. As noted the illuminator can be mounted on a rotatable object, or can be used by wearing on a person, pet or other device to provide a warning or locator light.

23 Claims, 11 Drawing Sheets

MOTION ACTIVATED ROTATABLE ILLUMINATOR

CROSS-REFERENCE TO RELATED APPLICATIONS

Provisional application 60/117,971, filed Jan. 29, 1999.
Provisional application 60/109,172 filed Nov. 20, 1998.

BACKGROUND OF THE INVENTION

Reflectors or lights are conventional means to increase night time visibility of any type of vehicles that have wheels. Additionally, it is known in the prior art to mount lights or reflectors on rotating objects to achieve an aesthetic result.

Reflectors alone lack the safety feature of providing an active source of illumination, making the user more vulnerable. For reflector type devices, it is necessary to have an external light source, which must shine directly on the reflector in order for the device to be visible. To alleviate this problem, active lighting methods have been developed. The active lighting methods use a light internal to the device which does not require external light to provide the safety or aesthetic light desired.

In order to operate these active lighting devices, it is necessary to turn on the light source using some type of switching mechanism. Switching mechanisms for active lighting devices consist of manual switching methods and automatic switching methods. Automatic switching methods which have been developed, however, have not resulted in a predictable and reliable method to turn on the lighting source when light is desired. This lack of reliability is due to the fact that different types of movement may be used to activate the light, requiring different kinds of sensing means. Additionally, automatic switches have not allowed lighting devices to automatically remain lit, even when the sensing means is not being actuated (such as when a bike rider is at a stop sign). The ability to keep the illumination device lit is juxtaposed against the ability of the device to maintain the longevity of the device's power supply. Existing active lighting devices have not addressed either of these concerns adequately. There exists a continuing need for a reliable active illumination reflective apparatus to provide visible light for both safety and aesthetic reasons which conserves its power while it operates automatically.

BRIEF SUMMARY OF THE INVENTION

The invention is an illumination device which can be mounted on a rotating object, typically a bike wheel. The invention utilizes two switching mechanisms and a timer to operate a light source. The switching mechanisms are activated by centrifugal motion and intermittent motion. These switches are used to turn on light emitting diodes, or electro-luminescent strips.

The light source is contained in a housing which emits a constant glow when activated. The invention eliminates problems associated with prior illumination or reflective devices by providing an internal source of light which is reliably activated upon the motion of the rotating object. The invention acts as a safety device as well as providing an aesthetically pleasing effect.

In one preferred embodiment, the illumination device is adapted for use on a rotatable object, and includes a housing mounted on that object. A light source is disposed within the housing, along with an electrical power source. A first switch is disposed within the housing and activated by intermittent motion of the housing. A second switch is also disposed within the housing and is activated by centrifugal forces caused by rotation of the rotatable object. The illumination device has a timer disposed within the housing. The timer has a timing cycle, and the timer is operably connected relative to the first switch and the second switch such that activation of either the first switch or the second switch initiates the timing cycle of the timer and enables the flow of electricity from the power source to the light source during the timing cycle. Preferably, the light source emits uninterrupted light for the duration of the timing cycle.

The invention relates not only to an illumination device apparatus, but also to a method of illumination which comprises mounting a housing on a rotatable object, activating a timer within the housing through intermittent motion of the housing, activating the timer through centrifuigal motion of the housing and energizing a light source within the housing upon activation of the timer.

BRIEF DESCRIPTION OF THE DRAWINGS

In this disclosure, several illumination devices are illustrated. Throughout the drawings, like reference numerals are used to indicate common features or components of those devices.

While the above-identified figures set forth several preferred embodiments of the invention, other embodiments are also contemplated, as noted in the discussion. In all cases, this disclosure presents the invention by way of representation and not limitation. It should be understood that numerous other modifications and embodiments can be devised by those skilled in the art which fall within the scope and spirit of the principle of the invention.

DETAILED DESCRIPTION

The inventive illumination device combines a timer and unique switching arrangement to effectively activate the light source of the device. The timer is used in conjunction with two different switching methods, allowing the light to reliably activate when the device is put into motion. Additionally, it emits a steady state light instead of the flashing light of prior art devices. The use of a continuous light causes the housing of the device to emit a glow. In one embodiment of the invention, an electro-luminescent (EL) light is mounted on a rotatable object to achieve illumination effects in a manner which has not been demonstrated previously. The EL light provides a continuous light permeating the entire illumination device.

Figure 1:
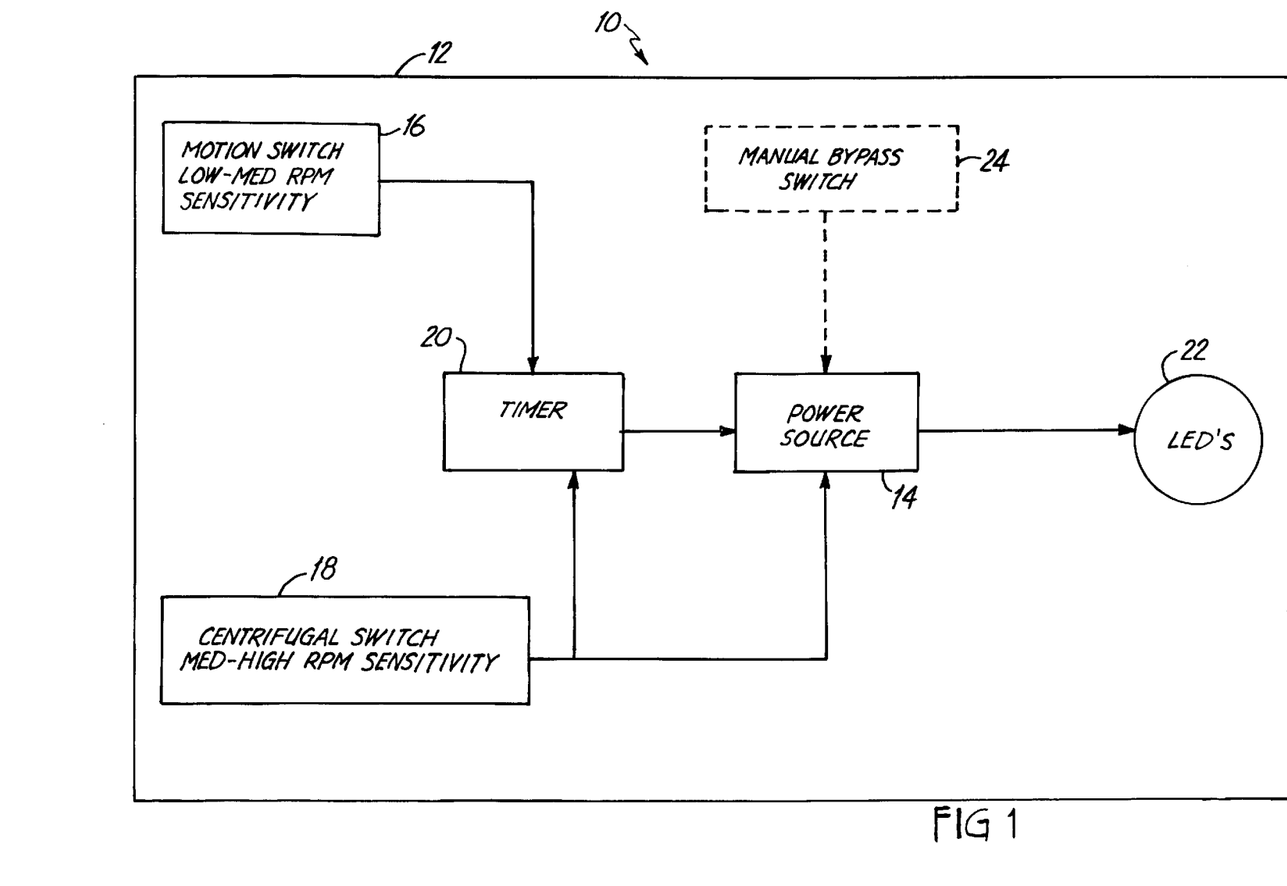
FIG. 1 is a block diagram of one embodiment of the inventive illumination device utilizing light emitting diodes.

FIG. 1 shows a preferred embodiment of an illumination device 10. Specifically, FIG. 1 shows a block diagram of the components in the illumination device 10. The illumination device 10 includes a housing 12. Located within the housing 12 are a power source "(or power supply)" 14, a motion switch 16, a centrifugal switch 18, a timer 20 and a light emitting diode (LED) 22.

The power source 14 is a battery of any of the type commercially available. The battery 14 is connected via wires (or traces on a circuit board) to a circuit in the illumination device 10. The motion switch 16 and centrifugal switch 18 are electrically connected to the timer 20 which is electrically connected to a light source, in this case the LED 22. Electricity is allowed to flow to the LED 22 by activation of either the motion switch 16 or centrifugal switch 18. The electricity, provided by the power source 14, travels from the power source 14 to the LED 22. This may occur either by use of electrical connections which run directly through the motion switch 16 or the centrifugal switch 18 and the timer 20 to the LED 22, or by providing a logic circuit which can activate a final switching mechanism such as a transistor. In the embodiment where a final switching mechanism is used, this final switch conducts power from the power source 14 to the LED 22 in a power section of the logic circuit (further discussed in relation to FIG. 2).

The motion switch 16 and the centrifulgal switch 18 act independently of each other and respond to different types of motion. Specifically, the motion switch 16 responds to any type of intermittent motion of the housing 12. Steady state motion, however, may not actuate the motion switch 16. Intermittent motion provides acceleration or deceleration of the housing 12 which is required to activate the motion switch 16. The centrifugal switch 18 actuates upon centrifugal forces being applied to it. However, the centrifugal switch 18 may not be sensitive enough to react to intermittent motion caused by minor movement of the housing 12. Thus, using both switches results in a situation where any type of motion of the housing (whether it be intermittent or steady state) enables the flow of electricity to the light source (LED 22). For example, if the illumination device 10 is mounted on a bicycle wheel, the type of movement of the bicycle wheel would dictate which switch was activated. If the bicycle wheel is moved intermittently (such as when the bike is first mounted by the bike rider) the motion switch 16 detects such motion and is activated. The motion switch 16 has low and medium revolutions per minute (RPM) sensitivity. The centrifugal switch 18 does not detect intermittent motion generated by low RPMs, since few if any centrifugal forces are being generated by someone sitting on a bicycle while it is stationary or only moving for short distances. On the other hand, when the bicycle is ridden at a constant pace, centrifugal forces are generated and the centrifugal switch 18 would be activated. The centrifugal switch 18 has medium to high RPM sensitivity. Once a constant riding motion is established, however, the motion switch 16 essentially sees a steady state universe and would not be activated by such motion (constant rotation or acceleration). In that instance the acceleration or deceleration forces are not large enough to activate the motion switch. An illustration of how the change in RPM affects the switches 16 and 18 can be demonstrated by using a 20 inch bicycle wheel with the illumination device 10 mounted two inches from the edge of the wheel. When the bike wheel rotates at 0–20 RPM, the motion switch 16 will activate. This range is called "Low RPM." When the wheel rotates at 20–60 RPM, either the motion switch 16 or the centrifugal switch 18 may activate. This range is called "Medium RPM." When the wheel rotates at 60 RPM and greater, the centrifugal switch will activate. This range is called "High RPM."

Figure 1A:
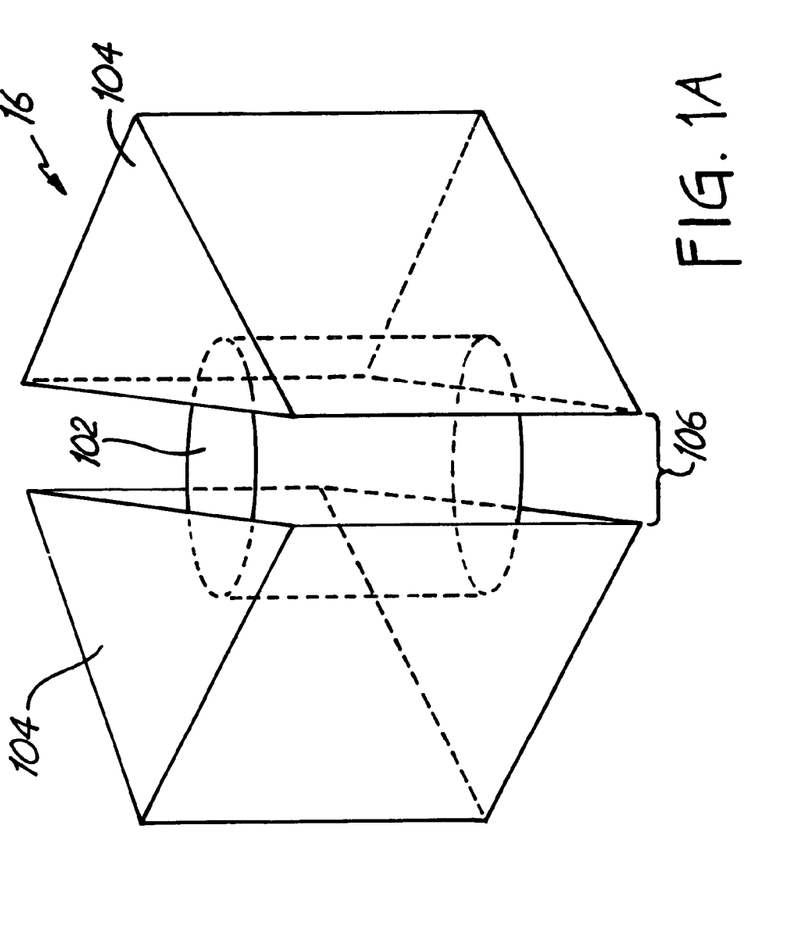
FIG. 1A shows one embodiment of a motion switch for use with the inventive illumination device.

Although any motion switch 16 may be used, one example which is used in the current invention is a ball and cage motion switch, shown in FIG. 1A. In this type of switch a metallic barrel 102 is used in conjunction with two electrical contacts 104A and 104B. The contacts are formed to resemble a metal box, with electrical separation 106 disposed through the middle of the box. The separation runs completely through the box, maintaining an air gap between one side of the box and the other side. Each side of the box is comprised of one of the electrical contacts 104, and the contacts 104 do not touch one another due to the electrical separation 106. However, the metallic barrel 102 is located within the box, so that when the housing 12 and the motion switch 16 are subject to motion, the metallic barrel 102 is moved to span the separation from one contact 104A to the other contact 104B, thereby creating an electrical connection from one contact 104A, through the metallic barrel 102, to the other contact 104B. In a preferred embodiment, the motion switch 16 is sensitive to motion in all three dimensional planes (x, y and z axes), such that discernable motion in any direction is sufficient to electrically activate the switch.

Although any suitable centrifugal switch 18 may be used, one example which is used in the current invention includes a thin strip of metal. One end of the strip is mounted to an electrical contact, and a second end of the strip is free floating. The second end may additionally have a weight attached thereto. The metal strip is flexible so that when a sufficient force is applied to it, the strip will bend to touch the second contact. The touching of the metal strip to the second contact allows electricity to flow from one contact, through the metal strip, to the other contact. The force applied to the metal strip is the centrifugal force which occurs when a circular object is rotated.

While the described switches are examples of what may be used in one embodiment of the present invention, other types of intermittent motion switches and centrifugal switches are known in the art and may be substituted to achieve the desired sensing and switching functions.

Another feature which may be included in the invention is the use of a manual bypass switch 24. The optional manual bypass switch 24 is shown in dotted lines in FIG. 1. The manual bypass switch 24 would preferably be electrically positioned between the power source 14 and the LED 22, in parallel with the connection established through the timer 20. Activation of the manual switch 24 would allow an operator to initiate the flow of electricity directly from the power source 14 to the LED 22, thereby bypassing the motion switch 16, the centrifugal switch 18 and the timer 20. Alternatively, the manual switch 24 may be electrically positioned in series with the connection established through the timer 20. Operation of the manual bypass switch 24 would allow an operator to prevent the illumination device from operating, conserving power in the batteries when illumination is not needed. An example of a manual bypass switch 24 that could be used is a soft-domed sealed switch, although any manual switch known to those skilled in the art may be used in this invention.

Figure 2:
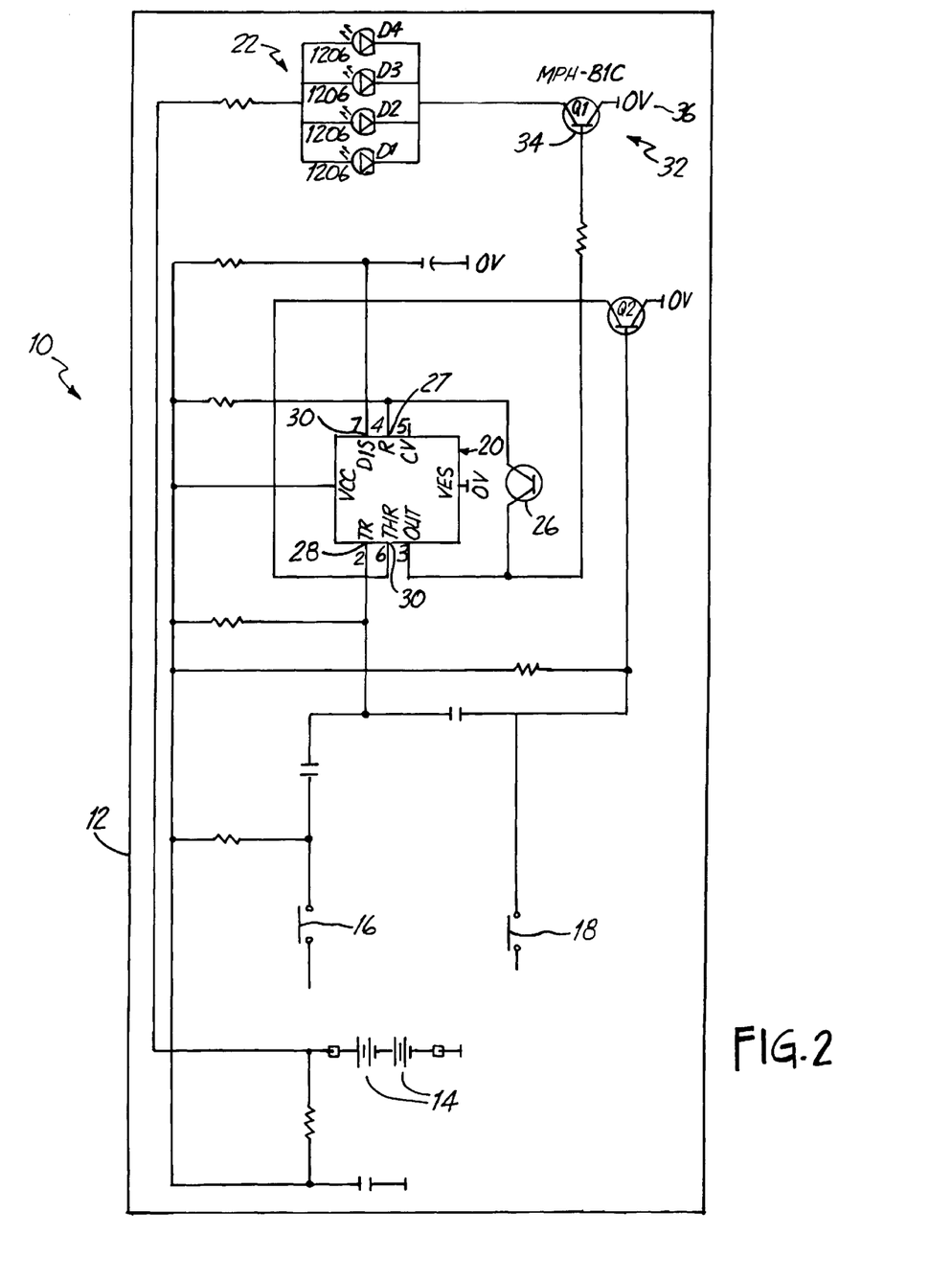
FIG. 2 shows an electrical schematic of one embodiment of an electrical circuit used in the invention.

The use of a photo-sensitive switch 26, as shown in FIG. 2, achieves a similar result. Placing the photo-sensitive switch 26 in series with the connection between the timer and the LED would not allow the illumination device 10 to operate when a designated amount of light was present, thereby conserving the batteries. FIG. 2 shows one possible embodiment using the photo-sensitive switch 26. The photo-sensitive switch 26 is connected to the timer 20 at a reset pin 27. When the photo-sensitive switch 26 is placed in a dark environment, its resistance increases and causes the timer to see a change in voltage at the reset pin 27. After the voltage at the reset pin 27 passes a pre-set level, the timer 20 is enabled, and activation of the motion switch 16 or the centrifugal switch 18 will start the timer.

Once the motion switch 16 or the centrifugal switch 18 is activated, an electrical signal is sent to the timer 20. In the preferred embodiment shown in FIG. 2, the timer 20 is a National Semiconductor LM555C type timer, although any timer known to those skilled in the art may be used. The signal sent to the timer 20 causes the timing cycle of the timer 20 to begin. Upon initiation of a timing cycle, an output signal is sent from the timer 20 to the LED 22, causing the LED 22 to light. The output signal may provide power directly to the LED 22, or the output signal may be sent to some other switching mechanism, such as a transistor 32. The transistor 32 in turn allows power to flow to the LED 22. The motion switch 16 and the centrifugal switch 18 are shown operating in parallel with respect to the timer 20. Intermittent motion which occurs when the housing 12 is moving at either low or medium RPM actuate the switches 16 and 18 and causes an electrical signal to be sent from the power source 14 to an activation trigger 28 located on the timer 20. When the housing 12 is rotated at high RPM, the centrifugal switch 18 activates, sending a signal to a threshold/discharge switch 30 located on the timer 20 (as well as to the trigger 28). Here the threshold/discharge switch 30 is actually a continuation of two pins on the timer 20. A person skilled in the art will recognize that using alternate timers may require signaling different pin configurations to achieve the desired results. When either trigger 28 or threshold/discharge switch 30 sees the electrical signal, the timer 20 sends a switching signal to a transistor 32. The transistor 32 sees the signal at its base 34 and allows current to flow from the power source 14 through the LED's 22 across the transistor 32 to ground 36. The switching signal in this embodiment is also connected to the photo-sensitive switch 26 By making this connection, voltage is added to the circuit which contains the photo-sensitive switch 26 and the reset pin 27. This has the effect of pushing the voltage at the reset pin 27 well past the pre-set level, which prevents "flickering" of the light. For example, if the photo-sensitive switch 26 was at a level of resistance which placed the reset pin 27 at or near the voltage pre-set, any slight change in lighting conditions could cause the photo-sensitive switch 26 to turn the timer on and off causing it to "flicker." The same could occur if the photo-sensitive switch 26 was intermittently exposed to external light such as the headlights of a car. Tying the photo-sensitive switch 26 to the output of the-timer 20 eliminates this "flickering" until the timing cycle is completed.

The timing cycle of the timer 20 is set so that activation of the timer 20 allows the timing cycle to run. The timing cycle typically is set to maintain power to the light source 10–12 seconds after motion stops. If one of the switches is activated while the timing cycle is in progress, another activation signal is sent to the timer, and the timing cycle resets. Using the timer in this fashion allows a constant, steady light to be emitted from the LED 22, even when the apparatus (usually a wheel) to which the illumination device 10 is attached is being rotated or moved intermittently, or there is a combination of different types of motion.

Additionally, the centrifugal switch 18 may be configured so that continuous activation of the centrifugal switch 18 bypasses the timing cycle in the timer 20 completely and either biases the timer 20 into a continuous "on" state, or allows a compete bypass of the timer 20 altogether. Biasing the timer 20 can occur through the threshold/discharge switch 30. Continuous activation of the centrifugal switch 18 causes the threshold/discharge switch 30 to cross a voltage threshold which then biases that timer 20 to a continuous "on" state. Bypassing the timer 20 can be accomplished by running a separate electrical connection to the LED 22 from the power source 14, through the centrifugal switch 18. The separate electrical connection allows the LED 22 to receive power when the centrifugal switch 18 is continuously activated. Continuous activation of the centrifugal switch 18 occurs when the illumination device 10 is subjected to large centrifugal forces due to high RPMs. Therefore, the electrical connection between the LED 22 and the power source 14 through the centrifugal switch 18 essentially acts as a high RPM timer bypass.

Figure 3:
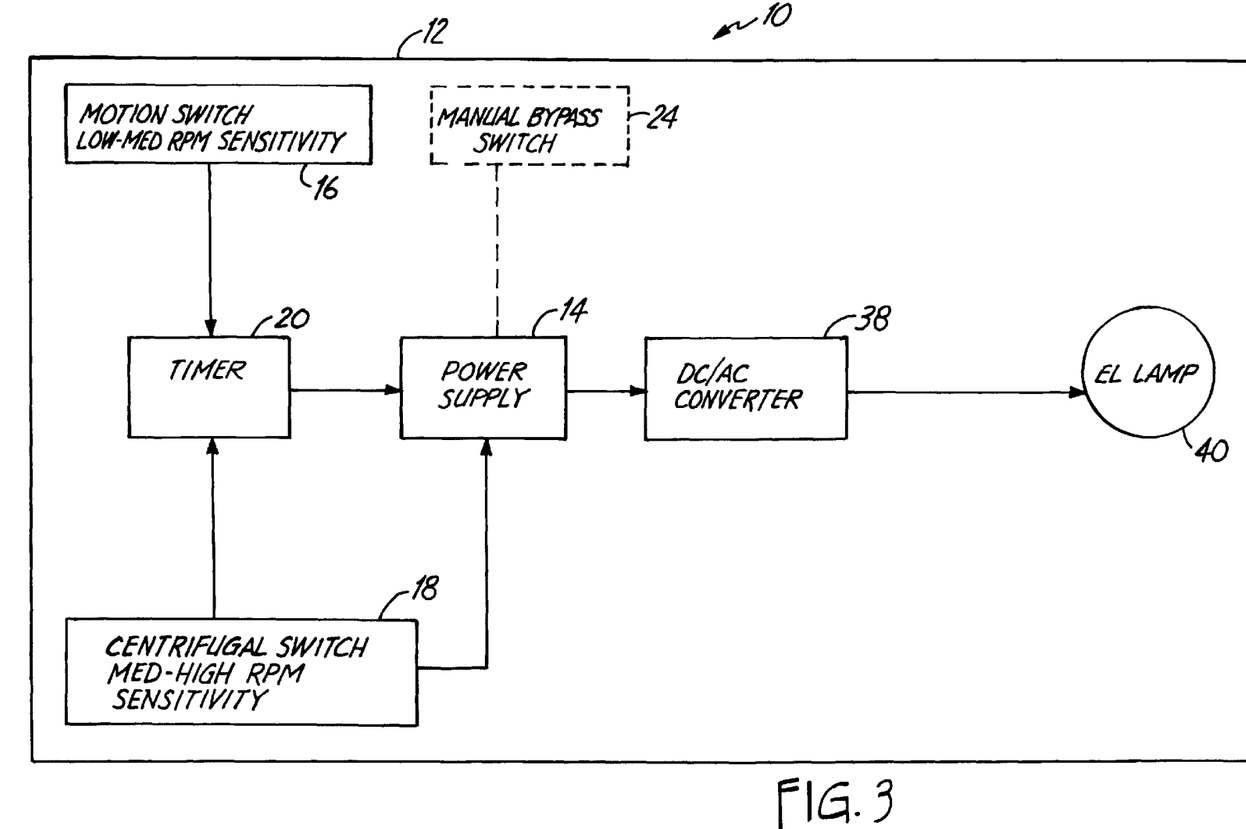
FIG. 3 is a block diagram of an alternate embodiment of the inventive illumination device utilizing an electro luminescent light strip.

FIG. 3 shows an alternate embodiment of the inventive illumination device 10. FIG. 3 shows a block diagram of the illumination device 10 constructed in the same fashion as the device of shown in FIG. 1, with the addition of a DC/AC (direct electrical current to alternating electrical current) converter 38, and the substitution of an electrical luminescent (EL) light 40 for the LED 22 discussed above. The DC/AC converter 38 receives power from the power source 14 and converts the direct current which is provided by the battery into alternating current. Such DC/AC converters are commercially available and may be of any style known by those skilled in the art to perform the requisite function. The EL light 40 requires that AC power be provided in order for it to emit light, and the DC/AC converter 38 provides this power. The EL light 40 used in this embodiment is a strip type which resembles paper and is approximately 20 mils thick. However, any EL light mechanism known to those skilled in the art may be used.

Figure 3A:
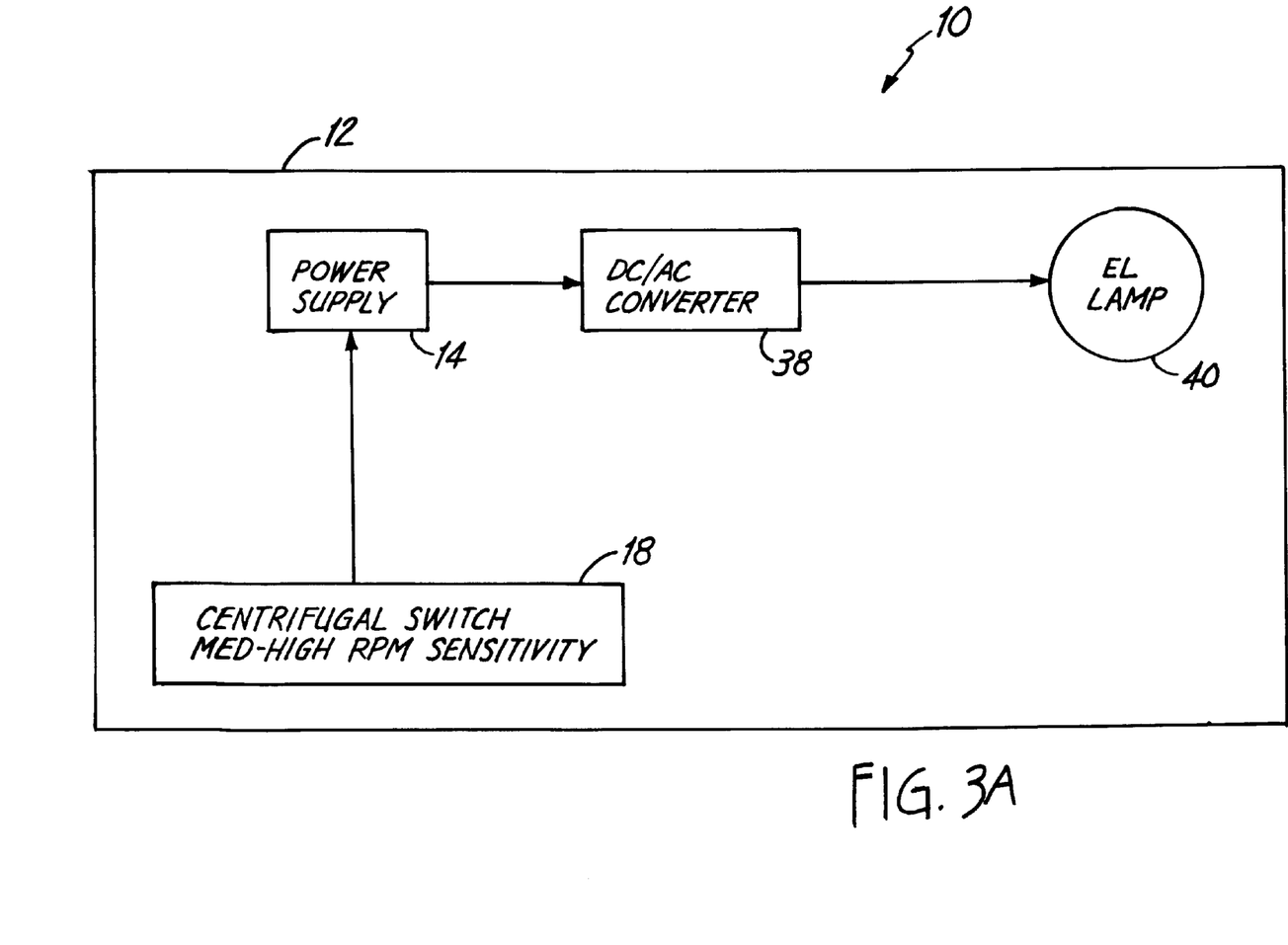
FIG. 3A is a block diagram of an alternate embodiment of the device in FIG. 3.

The use of an EL light 40 on a rotating object can be embodied in a simplified version, without all the components identified in FIG. 3. The illumination device 10 can contain any suitable power switching mechanism, either alone or in conjunction with any other switching mechanism. Additionally, it is not necessary for the EL embodiment of the illumination device 10 to contain a timer 20 as part of its internal electrical circuit. An alternate embodiment of the illumination device 10 illustrating this simplified circuit is shown in FIG. 3A. The circuit of the illumination device includes a power source 14 electrically connected to an EL light 40 through a centrifugal switch 18 and a DC/AC power converter 38. This configuration for the circuit of the illumination device 10 would be mounted in the housing 12 of the illumination device 10.

Figure 4:
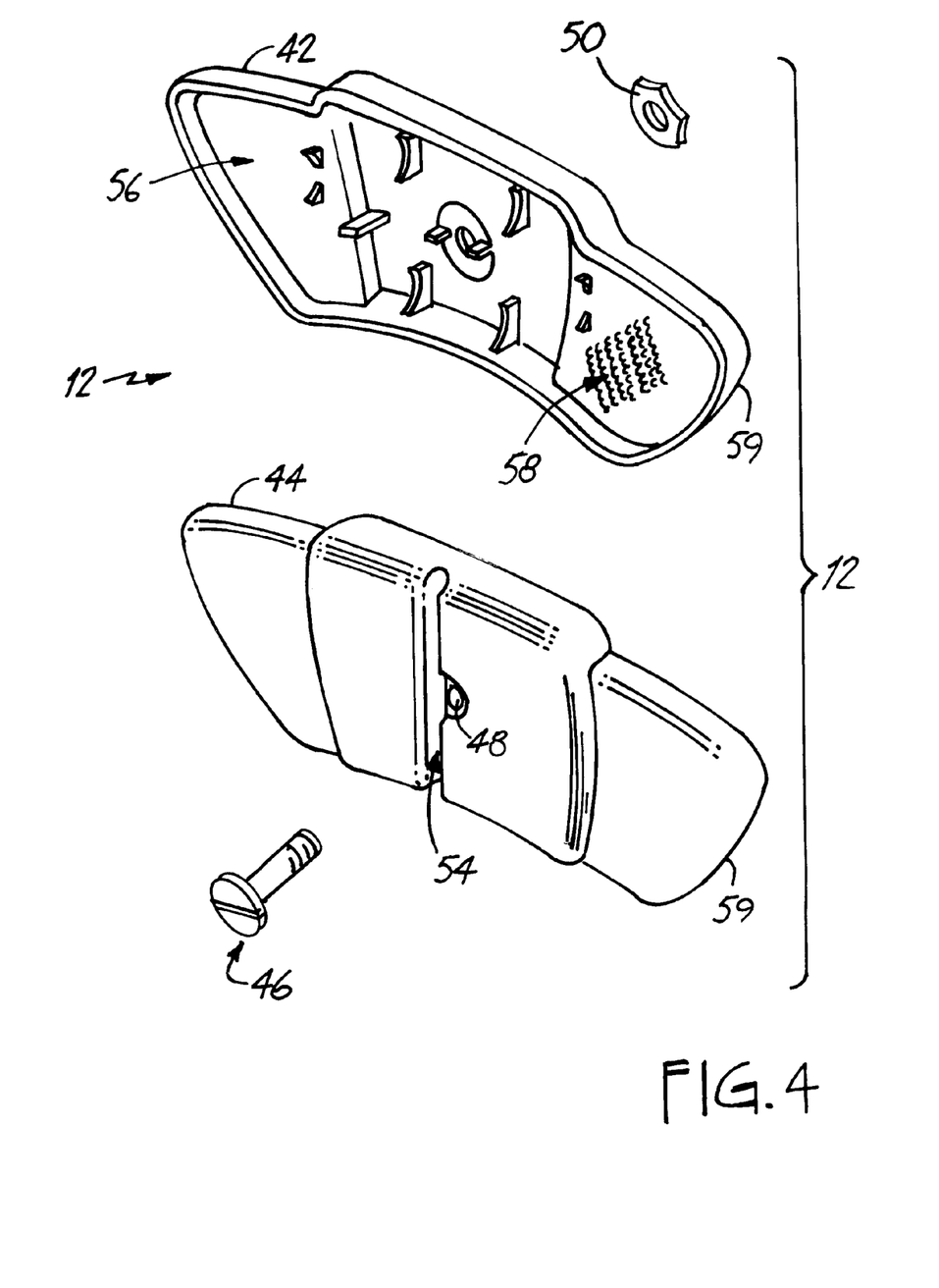
FIG. 4 is an exploded perspective view a housing for one embodiment of the reflective illumination device of the present invention, showing the separable housing halves of the reflective illumination device.

A preferred embodiment for the housing 12 of the illumination device is shown in FIG. 4 and has a first shell 42, and a second shell 44. The first shell 42 and the second shell 44 fit together using a perimeter tongue and groove method of attachment, known to those skilled in the art. The groove extends around the perimeter of one of the half shells, and a raised lip or tongue extends around the perimeter of the other half shell. When the two shells 42 and 44 are mated, the lip or tongue of one shell is inserted into the groove of the second shell. The fit is maintained in part due to friction between the tongue and groove. Fitting the two shells 42 and 44 together in this manner creates a weatherproof seal. Creating the seal is important, since keeping moisture out of the housing 12 prevents shorting of the electrical components in the illumination device 10. A single bolt 46 extends through a central aperture 48 in the two shells 42 and 44 and is held in place by a nut 50, thereby affirmatively affixing the shells 42 and 44 together. The head of the bolt 46 also serves to hold the illumination device 10 onto a bicycle spoke which has been fitted within spoke slot 54 on an outer surface of the second shell 44 (further described in relation to FIGS. 5 and 6).

As shown in FIG. 4, each shell 42 and 44 has an internal face 56 which, at least in part is defined by an array of prismatic lenses or prisms 58. The internal components of the illumination device 10 are mounted in an interior chamber defined between the first shell 42 and the second shell 44. The housing shells 42 and 44 are formed from a light-transmissive material (i.e., transparent or translucent), such as a clear polymer composition. Internal faces 56 of the shells 42 and 44 form the chamber in which the internal components are mounted. The prisms 58 located on the internal face 56 are of the type commonly found on bicycle reflectors known in the art. The prisms 58 are constructed so that external light which radiates on the housing 12 passes through the light-transmissive housing material and is then reflected back through the material and away from the housing 12. Additionally, the prisms 58 cause light which is generated internally to reflect back into the interior of the chamber in the housing 12 to be diffused as the emitted light passes through the housing material. Internal reflection allows the generated light to radiate through the housing 12 in a uniform fashion across the surface area of the housing 12. The result is that the entire illumination device 10 gives the appearance of seeming to "glow" as it emits radiated light. This eliminates a common problem in prior art illumination devices where only one portion of the housing appears to emit light (that portion adjacent to the light source). This dispersion of light is further enhanced by using LEDs 22 which are of the low profile (surface mount) wide angle type. In addition, any portion of the internal face 56 which does not have prisms 58 formed therein is formed to be "roughed" (further described in reference to FIGS. 7A and 7B) in order to evenly spread (diffuse) the generated light across the internal face 56 of the shell and produce more of an overall glowing illumination effect by the whole device. By keeping end portion 59 of the housing wide in relation to its overall dimensions, more light can escape out the end portions, making the device more easily visible from all sides. Wide ends also make it easier to place the LEDs 22 in the housing 12.

The use of the prisms 58 to reflect external light allows the illumination device 10 to act as a reflector even if the internal components of the unit are not activated (either through malfunction, lack of detectable motion, power failure or manual deactivation). Additionally, the reflection of external light reduces the absorption of possibly unwanted solar energy heat by the components on the inside of the housing 12. By preventing heat from entering the housing 12, the power source 14 (e.g., batteries) is prevented from discharging prematurely. Many batteries lose their stored charge at a quicker rate when subjected to heat. For example, the shelf life of alkaline batteries starts to decline at 45° Celsius and then rapidly accelerates toward complete discharge at 60° Celsius.

Figure 5:
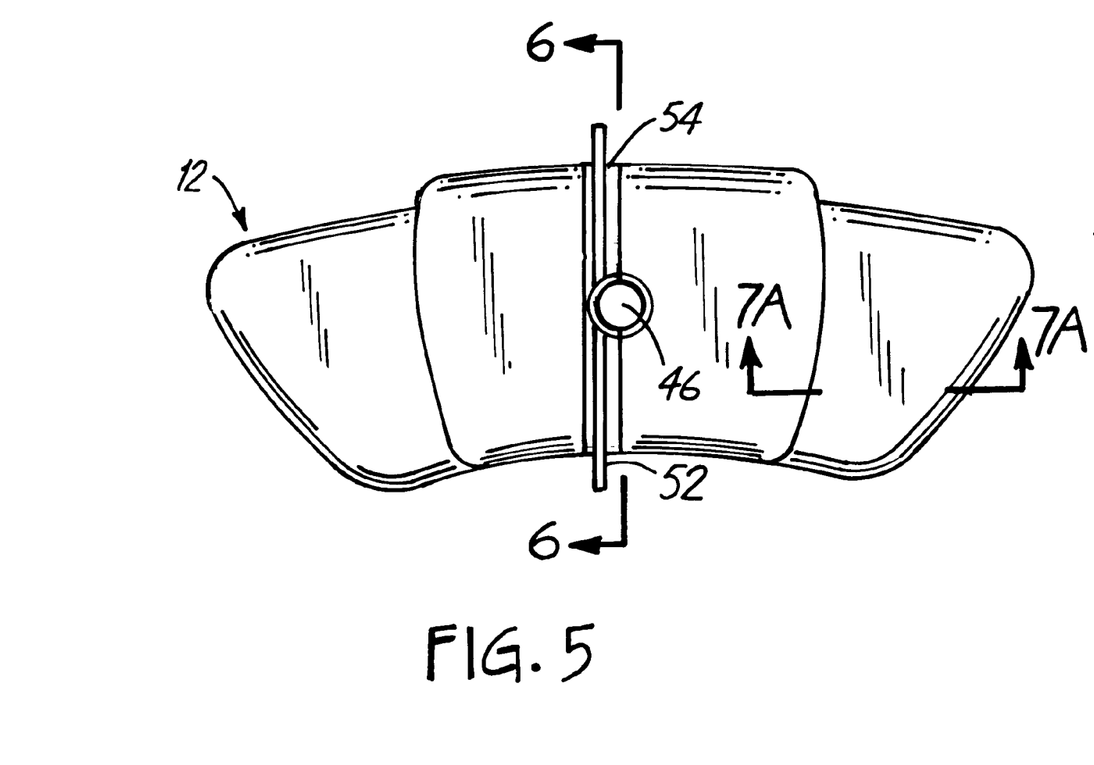
FIG. 5 is a side elevational view of the housing of FIG. 4, showing the housing mounted to a bicycle wheel spoke.
Figure 6:
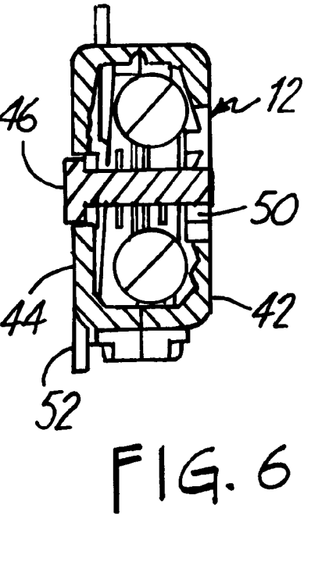
FIG. 6 is a sectional view as taken along lines 6—6 in FIG. 5.

As shown in FIGS. 5 and 6, the housing 12 may be mounted on a bicycle by placing it on a spoke 52, using the spoke slot 54 in the second shell 44 of the housing 12. To mount the housing 12 the spoke 52 is disposed into the spoke slot 54 and the bolt 46 is inserted through the housing 12 so that the head of the bolt 46 maintains the position of the spoke 52 within the spoke slot 54. The housing 12 must be positioned away from the axis of rotation of the wheel in order for centrifugal forces to be generated, and actuate the centrifugal switch 18. A nut 50 is placed on the bolt 46 on the opposite side of the housing 12 from the head of the bolt 46 and tightened to prevent the housing 12 from sliding along the spoke 52. Different types of nuts 50 may be used. A wingnut may be used, allowing easy mounting and dismounting of the illumination device 10 for transfer and storage. Alternatively a Nylock nut may be used in combination with a Phillips style bolt head in order to inhibit easy removal of the illumination device 10, and act as an anti-theft device. If desired, additional screws may be added to the housing 12 in order to provide a tighter seal between the first shell 42 and the second shell 44.

Figure 6A:
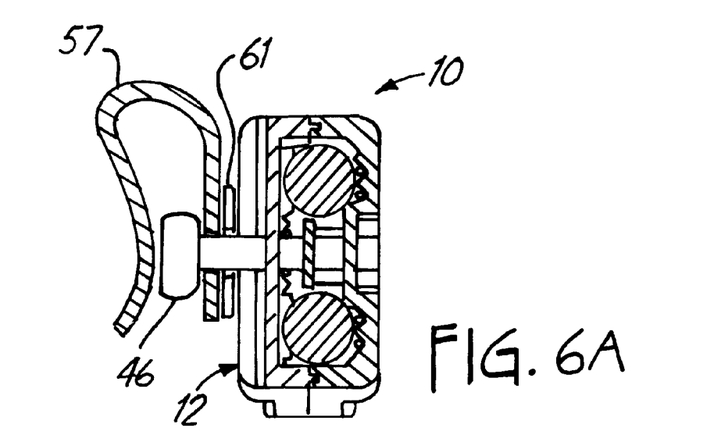
FIG. 6A is a sectional view showing an alternate embodiment of the device including a mounting clip.

In one embodiment shown in FIG. 6A, a clip 57 may also be positioned between the head of the bolt 46 and the housing 12. The clip 57 is of the type commonly found to attach items to articles of clothing (i.e., a belt clip). By placing the clip 57 between the head of the bolt 46 and the housing 12, tightening the nut 50 onto the bolt 46 keeps the clip 57 from twisting on the shaft of the bolt 46. Other ways to prevent the twisting of the clip 57 would be by placing a washer 61 between the housing 12 and the clip 57, or by molding the clip 57 so that it included a tongue, or lip which could be placed within the spoke slot 54. The clip 57 can be used to mount the illumination device 10 on any number of objects, including onto articles of clothing, pet collars, wagons, etc.

Figure 7:
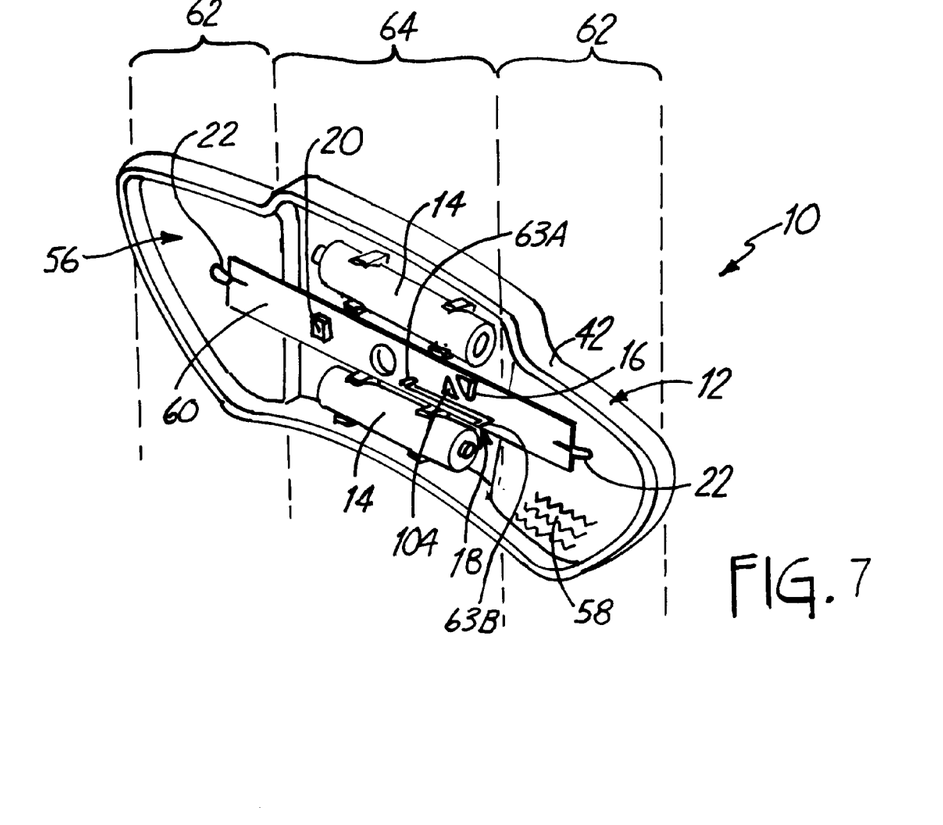
FIG. 7 is a perspective view of one half of the housing of FIG. 6 and the electrical components of the reflective illumination device therein, in an embodiment utilizing light emitting diodes.

FIG. 7 shows one physical embodiment of the LED version of the invention. The illumination device 10 has one shell 42 of the housing 12 exposed so that the components are displayed which comprise the illumination device 10. Those components include a circuit board 60 and the power supply 14. The circuit board 60 is mounted to the housing 12 and has the intermittent switch 16, the centrifugal switch 18, the timer 20 and LEDs 22 mounted thereon, as previously described.

The housing 12 is divided into three zones. A spoke zone 62 includes the section on either side of the circuit board 60 which contains the LEDs 22. The component zone 64 is disposed in the middle of the housing 12 and contains the power source 14 and the portion of the circuit board 60 upon which the switches 16 and 18 and the timer 20 are mounted. In this embodiment, the centrifugal switch 18 is fixed at one end (end 63A) to the circuit board 60 and has its free end (end 63B) free to move and activate the switch 18 by touching one of the electrical contacts 104 of the motion switch 16. The batteries used as the power source 14 are centered in the housing 12 in order to provide a rotational balancing effect on the illumination device 10 when the rotating object upon which it is mounted is in motion. At least one LED 22 is disposed in each spoke zone 62 of the illumination device 10. Preferably, the LEDs 22 are mounted to extend past the circuit board 60, to prevent the circuit board 60 from blocking light given off by LEDs 22. The light from LEDs 22 is reflected internally by prisms 58.

Figure 7A:
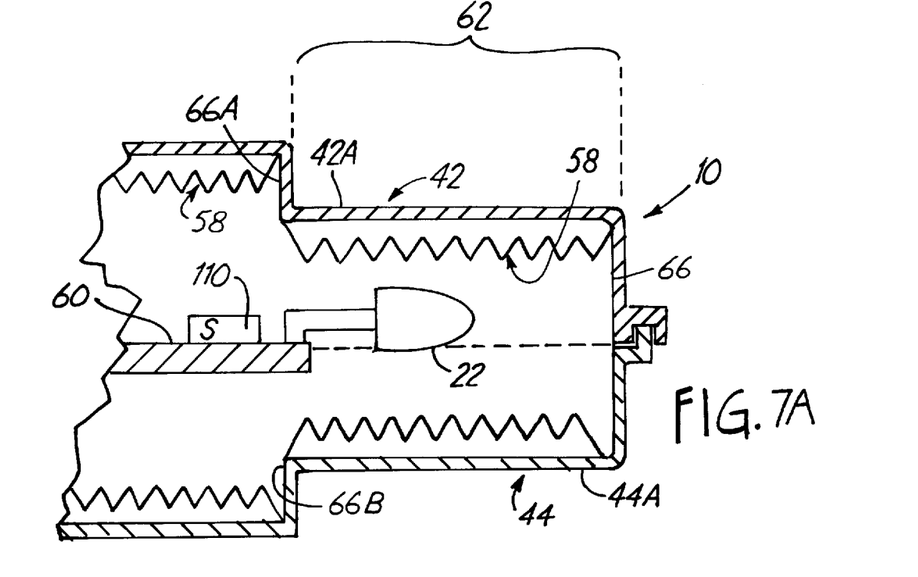
FIG. 7A is an enlarged sectional view as taken generally along lines 7A—7A in FIG. 5.
Figure 7B:
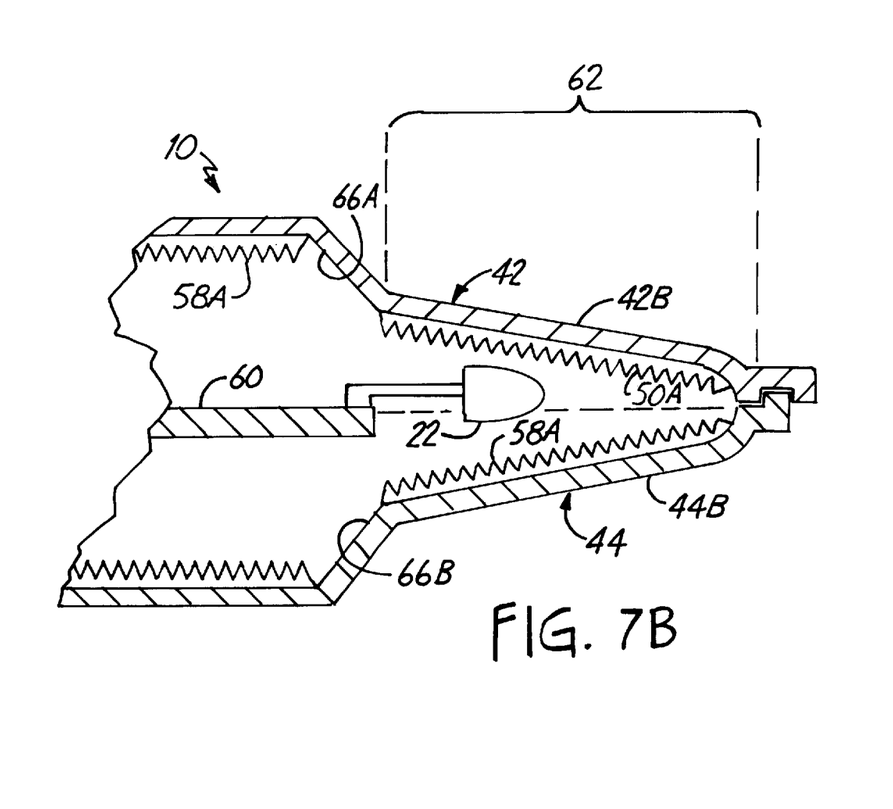
FIG. 7B is an enlarged a sectional view, similar to FIG. 7A of an alternative embodiment.

One embodiment of the prisms 58 is shown (again, not to scale) in FIG. 7A. The LED 22 is mounted so as to project light into the spoke zone 62 formed by the shells 42 and 44 of the housing 12. The prisms 58 reflect the light throughout the housing 12 which causes light dispersion and the resulting "glow" of the housing 12. Interior surfaces of end walls 66 in the housing 12 are "roughed" to further the dispersion of the light. Here, opposed side walls 42A and 44A of the housing 12 are shown at right angles from each other, however, an alternate embodiment, shown in FIG. 7B shows slanted side walls 42A and 44B. The use of slanted walls decreases the amount of room in the spoke zone 62 of the housing 12. Accordingly, prisms can be formed so that they are very shallow. These shallow prisms are called "micro-prisms" 58A. Using micro-prisms 58A allows more room to be created in the spoke zone 62 for the placement of the LEDs 22. The effect of light dispersion remains the same, however. Although the embodiments shown in FIGS. 7A and 7B show only one type of prism used in each embodiment, a person skilled in the art, will recognize that various prism styles can be used together in the same embodiment. For example an alternative embodiment can contain both micro prisms as well as regular prisms formed over at least a portion of the interior chamber of the housing 12. Sections 66A and 66B as well as the end walls 66 of the housing 12 are roughed in order to further the glowing effect of the illumination device 10.

A safety switch 110 can be provided with the illumination device 10 to disconnect power to the circuit when the first shell 42 is separated from the second shell 44 (as shown in FIG. 7A). A number of methods may be used to accomplish this safety shut off mechanism, including using a jumper or a reed contact switch known in the art. One example would be the mounting of the batteries to the first shell 42 onto mounting platforms which are molded into the first shell 42. The printed circuit board 60 is attached to the second shell 44. A contact connector is disposed between the batteries and the printed circuit board 60 so that when the shells 42 and 44 are pulled apart, the contact is broken. Thus, transfer of power from the batteries is disconnected from the printed circuit board. A safety switch 110 can be particularly useful when the illumination device 10 contains an EL light strip 40. The power which is distributed to the EL light strip 40 must be at least 70 volts AC in order to activate the light. Since this level of voltage is a possible shock hazard, a safety switch 110 may be necessary to comply with safety standards.

Figure 8:
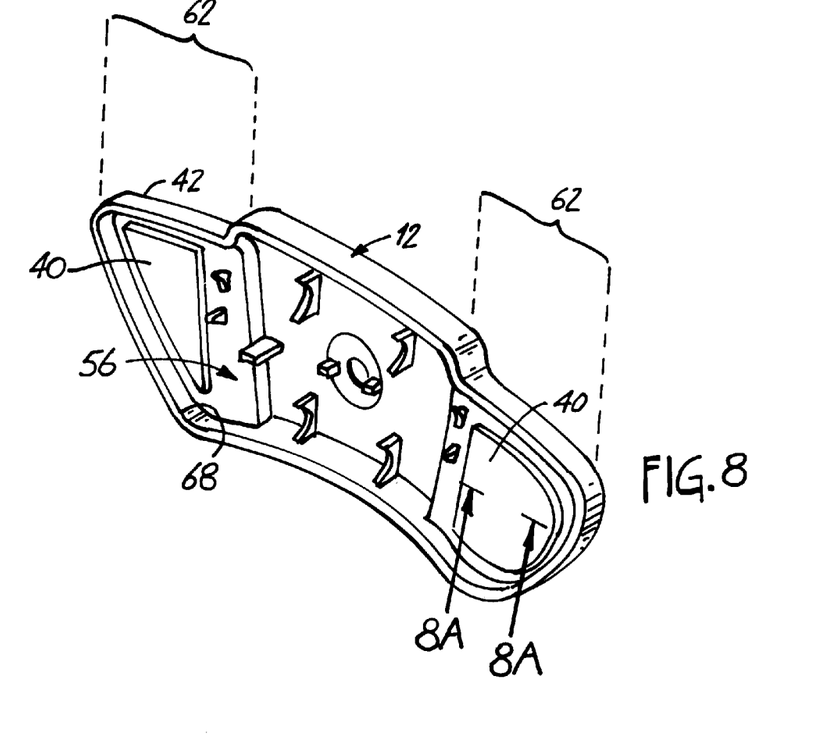
FIG. 8 is a perspective view of one half of the housing of FIG. 6, showing an embodiment with electro luminescent (EL) light strips mounted therein.

One or more EL light strips 40 may be used in place of the LEDs 22 to provide light to the illumination device 10, as shown in FIG. 8. FIG. 8 shows an alternate embodiment of the illumination device 10, without internal components (with the exception of the EL light strips 40). The EL light strips 40 can be mounted on the housing 12 by attaching the EL light strips 40 to the internal face 56 of the housing 12. The EL light strip 40 may also be mounted to the interior of the housing 12 by attaching it to a rim 68 which runs around the interior of the housing 12. Due to cost constraints, the EL light strip 40 may be used in small pieces and have higher levels of power applied to them. The result is a brighter than normal light emitted from the EL light strip 40 in a localized region in the housing 12 of the illumination device 10, similar to the light emitted by an LED.

Figure 8A:
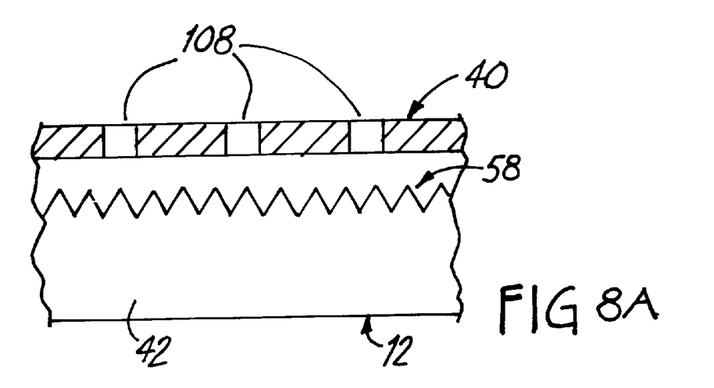
FIG. 8A is a cross-sectional view as taken generally along lines 8A—8A in FIG. 8.

Although the mounting of the LEDs 22 and EL light strips 40 are described above to be mounted in the housing 12 in a specific configuration, this by no means limits the possible configurations in which the lighting mechanisms can be mounted. For example, multiple LEDs may be mounted on either side of the circuit board 60 or at other locations within the housing 12. The LEDs 22 may face away from the component zone 64, towards the spoke zone 62. Alternatively they may face away from the spoke zone 62, towards the component zone 64. They may be mounted in the component zone 64. They may be mounted perpendicularly to the circuit board 60, or they may be mounted parallel to the circuit board 60. Additionally, jumbo LEDs of the type known in the art may be used to provide additional light. In the embodiment of the invention using an EL light strip 40, the light may be mounted on only a portion of the internal face 56 of the housing 12 (e.g., in spoke zones 62, as seen in FIG. 8), or may be mounted on some other internal housing surfaces, or on all the surfaces internal to housing 12. The EL light strip 40 can have holes 108 which extend through the light strip 40 (as shown in FIG. 8A). The holes 108 facilitate internal reflection of light within the housing 12 increasing the "glowing" effect discussed previously. Additionally, the EL light strip 40 may be shaped to form a logo or design. The use of the EL light strip 40 may be further emphasized by creating a transparent "window" without prisms in the housing 12 immediately adjacent to the EL light strip 40. The use of such a window, or alternatively of making the entire housing transparent (prismless), would allow any shapes or designs of the EL light strip 40 to clearly stand out to an observer.

The light source (LEDs 22 and EL light strips 40) may emit any light in any color of the visible spectrum. Currently, LED lights 22 are commercially available in red, green, and yellow. These LED colors can also be combined in a single LED and "morphed" from one color into the next. This "morphing" of colors emitted by LEDs 22 is known to those skilled in the art. The LEDs 22 may also be of a high efficiency type in order to maintain a high lifetime of the power source. The EL light strips 40 are also available in any color of the visible spectrum. Additionally, EL light strips 40 can also "morph" from one color to the next. Any combination of color of light and the use of alternating colors, in any sequence, can be included in this invention.

When one or more batteries are used as the power source 14, they can be mounted in any suitable fashion within the housing. They may be mounted on the printed circuit board 60, or alternately they may be aligned by seats or sockets molded into the chamber of the housing 12 and/or mounted using suitable fasteners to the housing 12. One method of holding the batteries in place is through use of contact springs. These are known in the art, and consist of flexible metal strips which are mounted to exert a force on the contact faces of the battery. The force acts to hold the batteries in place between the metal strips.

Figure 9:
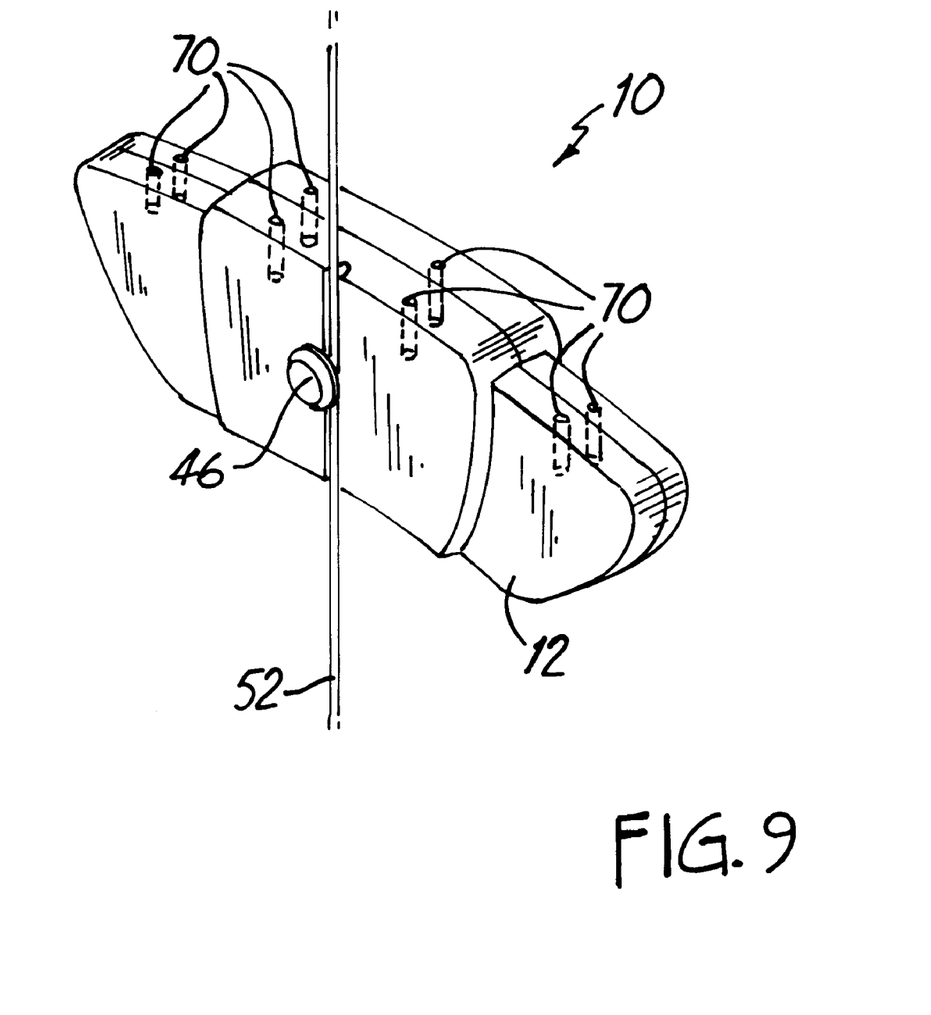
FIG. 9 is a perspective view of an alternative embodiment of the housing of the present invention mounted on a bicycle wheel spoke, with air holes disposed through the housing of the invention.

As shown in FIG. 9, the housing 12 may additionally include one or more vent or pin holes 70 which allow air to enter the chamber defined between the two shells 42 and 44. Air may be required when the power source 14 consists of Zinc-Air batteries. Zinc-Air batteries provide for a longer life of the power source 14 than some other battery types, but require air in order to operate effectively. When holes 70 are provided in the housing, the placement of the holes 70 may be critical in order to remove moisture from the interior of the housing 12. The holes 70 are positioned through the surface of the housing 12 exposed to the greatest amount of centrifugal force (the surface farthest away from the axis of rotation of the rotating object). By placing the holes 70 in the surface farthest away from the axis of rotation, moisture is forced out of the housing 12 by the centrifugal forces generated through the rotation of the wheel (or any other rotating object) to which the illumination device 10 is mounted. Keeping moisture out of the housing 12 maintains the integrity of the electrical connections internal to the illumination device 10 by preventing electrical shorts and corrosion. Additionally, the housing 12 may contain silica gel in the chamber to absorb excess moisture which enters the housing 12 and would be detrimental to the electrical components therein (whether the housing has vent holes 70 or not).

Though the illuminated reflective apparatus of the present invention is described primarily in relation to mounting it on a bicycle, it may be used in many other applications. The invention can be mounted on any rotating object, which would include, for example, bicycle wheels, flying discs, roller skate wheels, skateboard wheels, motorcycle wheels, wheel chair wheels, baby carriage wheels, and car wheels. This is by no means an exhaustive list. Any rotating object, most likely a wheel, may be used to provide the triggering motions and attendant forces which are necessary to activate the both of the switches and cause illumination. Indeed, the inventive illumination device 10 will operate effectively to provide a warning light for any object subject to motion, even if it is not a rotating object. For example, the device 10 could be worn by a runner or walker, or could be mounted on the side of a mobile device such as a wagon or stroller, or could be mounted on a pet's collar or leash.

The device may be mounted using any of a number of alternate methods besides that discussed above. Any mounting method which securely attached the illumination device 10 to the moving object is acceptable. The device 10 may use either electro luminescent light, LEDs or other suitable light radiation sources to provide this illumination. Additionally, other sensory devices may be added to the illumination device 10 to provide various effects. For example a whistle or noisemaker may be mounted on or in the illumination device 10 to create sound when the illumination device 10 is in motion on a rotating object. This invention thus provides a continuous source of light which can be provided for either safety or aesthetic use, on a rotating object. It allows the light to be activated automatically, and without an intermittent flashing or flickering of the light.

Although the present invention has been described with reference to preferred embodiments, workers skilled in the art will recognize that changes may be made in form and detail without departing from the spirit and scope of the invention.

What is claimed is:

1. An illuminator for use on a rotatable object comprising:
   a housing mounted on a rotatable object;
   a light source disposed within the housing;
   an electrical power source disposed within the housing;
   a first switch disposed within the housing and activated by intermittent motion of the housing;
   a second switch disposed within the housing and activated by centrifugal forces caused by rotation of the rotatable object; and
   a timer, having a timing cycle, disposed within the housing, the timer being operably connected relative to the first switch and the second switch such that activation of either the first switch or the second switch initiates the timing cycle of the timer and enables the flow of electricity from the power source to the light source during the timing cycle.

2. The illuminator of claim 1 and further comprising:
   a manual switch, wherein operation of the manual switch enables electricity to flow from the power source to the light source.

3. The illuminator of claim 1 wherein the light source is a plurality of light emitting diodes.

4. The illuminator of claim 1 wherein the first switch is comprised of a movable element and two electrical contacts, where the movable element contacts one electrical contact when the housing member is stationary and contacts both electrical contacts when the housing member is moved.

5. The illuminator of claim 1 wherein the housing is defined by a pair of separable halves.

6. The illuminator of claim 1 wherein an interior chamber is defined within the housing which contains the power source, the light source, the first switch, the second switch and the timer.

7. The illuminator of claim 1 wherein activation of the second switch continuously for a period of 10–12 seconds results in the second switch bypassing the connection to the timer.

8. The illuminator of claim 1 and further comprising:
   a light sensitive switch disposed within the housing, the switch having a low-light closed state which enables the flow of electricity to the light source and a high-light open state which prevents the flow of electricity to the light source.

9. The illuminator of claim 1 wherein the light source is an electro-luminescent (EL) strip.

10. The illuminator of claim 9 wherein the EL strip emits multiple colors of light.

11. The illuminator of claim 1 wherein the second switch is a centrifugal motion switch.

12. The illuminator of claim 11 wherein the centrifugal motion switch has a first fixed electrical contract and a second movable electrical contact, the second contact having a resilient member fixed at one end and movable, at its second end, between a first position spaced from the first electrical contact when the housing is stationary and a second position contacting the first electrical contact when the housing is subjected to centrifugal motion.

13. The illuminator of claim 1 wherein the light source is a light emitting diode (LED).

14. The illuminator of claim 13 wherein the LED is disposed to project light in any direction relative to the housing.

15. The illuminator of claim 13 wherein the LED emits multiple colors of light.

16. The illuminator of claim 1 wherein the housing is formed from a light-transmissive material and further comprising:
   a plurality of prisms defined on portions of the housing.

17. The illuminator of claim 16 wherein portions of the housing are roughed to create a diffusing surface.

18. The illuminator of claim 16 wherein the prisms are aligned to reflect external radiation incident on the housing.

19. The illuminator of claim 16 wherein opposed sides of the housing converge, and wherein in some areas, the prisms are micro prisms.

20. The illuminator of claim 9 wherein the power source is a DC power source and further comprising:
   a DC/AC convertor disposed within the housing, the convertor operably connected between the power source and the EL light.

21. In a motion-activated illuminator of the type having a housing, a light source in the housing, an electrical power source in the housing and a first motion detection switch in the housing for electrically coupling the power source to the light source in response to a first category of motion of the housing, the improvement comprising:

a second motion detection switch in the housing for electrically coupling the power source to the light source in response to a second category of motion of the housing; and a timer in the housing, the timer being connected relative to the first and second motion detection switches such that activation of either the first switch or the second switch initiates a timing cycle of the timer and enables electrical coupling of the power source and the light source only during the timing cycle.

22. An illuminator for use on a rotatable object comprising:

a housing mounted on a rotatable object;

an electro-luminescent (EL) strip disposed within the housing, wherein the EL strip has apertures therethrough to permit light to pass through the EL strip;

an electrical power source disposed within the housing;

a first switch disposed within the housing and activated by intermittent motion of the housing;

a second switch disposed within the housing and activated by centrifugal forces caused by rotation of the rotatable object; and a timer, having a timing cycle, disposed withing the housing, the timer being operably connected relative to the first switch and the second switch such that activation of either the first switch or the second switch initiates the timing cycle of the timer and enables the flow of electricity from the power source to the light source during the timing cycle.

23. An illuminator for use on a rotatable object comprising:

a housing mounted on a rotatable object, wherein the housing is defined by a pair of separate halves;

a light source disposed within the housing;

an electrical power source disposed within the housing;

a first switch disposed within the housing and activated by intermittent motion of the housing;

a second switch disposed within the housing and activated by centrifugal forces caused by rotation of the rotatable object;

a timer, having a timing cycle, disposed within the housing, the timer being operably connected relative to the first switch and the second switch such that activation of either the first switch or the second switch initiates the timing cycle of the timer and enables the flow of electricity from the power source to the light source during the timing cycle; and a contact switch which is opened when the separable halves of the housing are separated to prevent the flow of electricity to the light source.

* * * * *